Dec. 8, 1931.   R. G. MANSFIELD   1,835,070
PROCESS OF PNEUMATICALLY FEEDING GRANULAR MATERIAL INTO A LIQUID
Filed June 8, 1926   2 Sheets-Sheet 1

INVENTOR:
Ralph G. Mansfield,
BY
ATTORNEYS.

Dec. 8, 1931.  R. G. MANSFIELD  1,835,070
PROCESS OF PNEUMATICALLY FEEDING GRANULAR MATERIAL INTO A LIQUID
Filed June 8, 1926  2 Sheets-Sheet 2

INVENTOR:
Ralph G. Mansfield,
BY
Byrnes Townsend Brickenstein,
ATTORNEYS.

Patented Dec. 8, 1931

1,835,070

UNITED STATES PATENT OFFICE

RALPH G. MANSFIELD, OF LA SALLE, NEW YORK, ASSIGNOR TO UNION CARBIDE COMPANY, A CORPORATION OF VIRGINIA

PROCESS OF PNEUMATICALLY FEEDING GRANULAR MATERIAL INTO A LIQUID

Application filed June 8, 1926. Serial No. 114,589.

The present invention relates to a process of pneumatically feeding granular or pulverulent material into an aqueous solution or other liquid and to means for carrying out such process. The invention has a particular application in the production of cyanamide solutions from calcium cyanamide or "nitrolim."

The invention has for an object the bringing of a granular or pulverulent material into intimate relation with a liquid with which it is desired to effect a chemical reaction or to effect a suitable physical admixture by employing a current of air or other gaseous fluid as a propellant, entraining the granular or pulverulent material in the said current and leading the said gaseous current into said liquid, or causing it to impinge on the surface of the liquid, under pressure sufficient to cause uniform and effective incorporation of the granular solid material into the liquid.

The invention has for a further object the preparation of cyanamide solutions substantially free from dicyandiamide.

The invention also comprises apparatus for carrying out the above-mentioned objects.

Further objects of the invention will appear from the drawings and the following detailed description.

Figure 1:
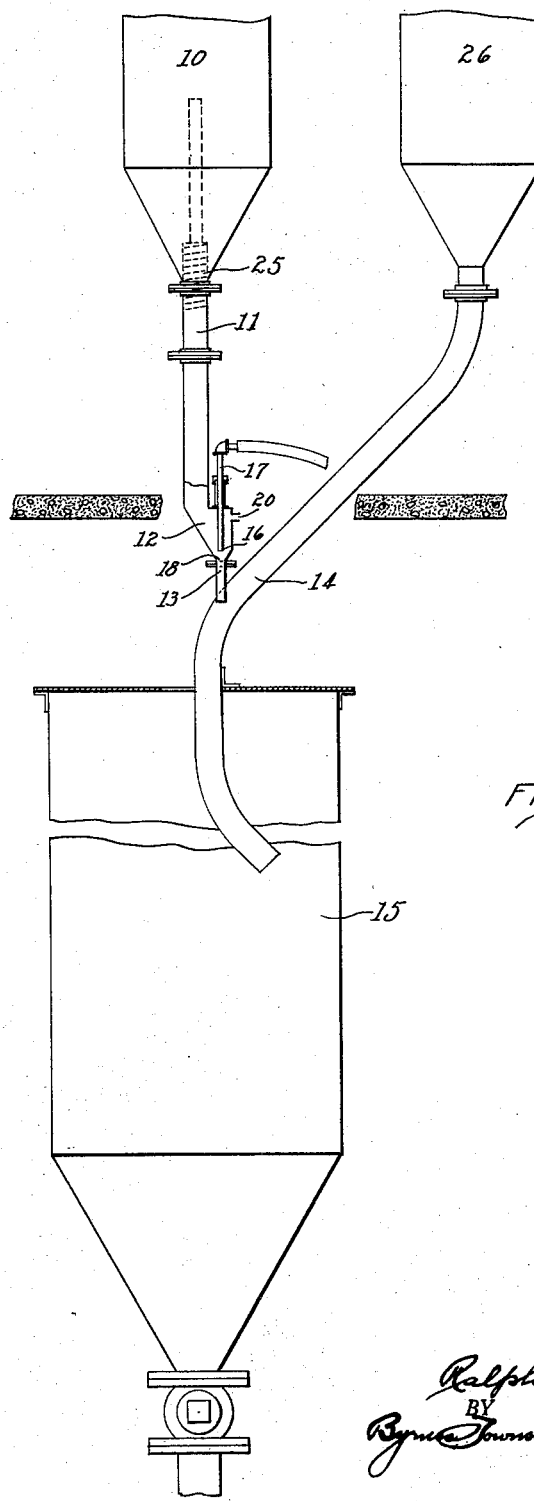
Fig. 1 is a diagrammatic showing of apparatus embodying pneumatic feeding means for carrying out the present invention.

In Fig. 1, 10 represents a granular material storage container connected through a pipe 11 with a hopper-shaped chamber 12 in which is positioned means for pneumatically conveying material through an outlet pipe 13 to a conduit 14. The conduit 14 is shown as terminating within a tank or other suitable container 15. The pneumatic feeding means, which is shown somewhat more in detail in Fig. 2, comprises an injector nozzle 16 connected by means of the pipe 17 to a source of compressed air or other gaseous medium. The injector nozzle 16 is so positioned adjacent the outlet orifice 18 as to discharge axially of the pipe 13. In the preferred form of apparatus the outlet pipe 13 is so formed as to provide a Venturi-shaped structure 19 adjacent the outlet orifice 18. According to well-known principles, when a jet of gaseous fluid is caused to flow from the nozzle into the outlet orifice 18 a reduction of pressure is induced about the nozzle. This tends to draw the particles of granular material into the current of gas issuing from the nozzle. This action is promoted by forming an orifice 20 at a point in the chamber 12 remote from the outlet orifice 18 through which orifice 20 air or other gas is caused to be drawn in to assist in carrying the granular material to the bottom of the hopper and to prevent the formation of scaffolds of the material in the hopper. The pipe 17 passes through a sleeve 21 and is shown to be in sliding fit with a nut 22 which is threaded onto the end of the sleeve 21. A suitable packing 23 is arranged in the recess 24 so as to form a gas tight seal between the pipe 17, the nut 22 and the sleeve 21. The pipe 17 is adjustable longitudinally of the sleeve 21 to permit of the positioning of the nozzle 16 at such distance from the outlet orifice 18 as will insure the best operating conditions.

Figure 2:
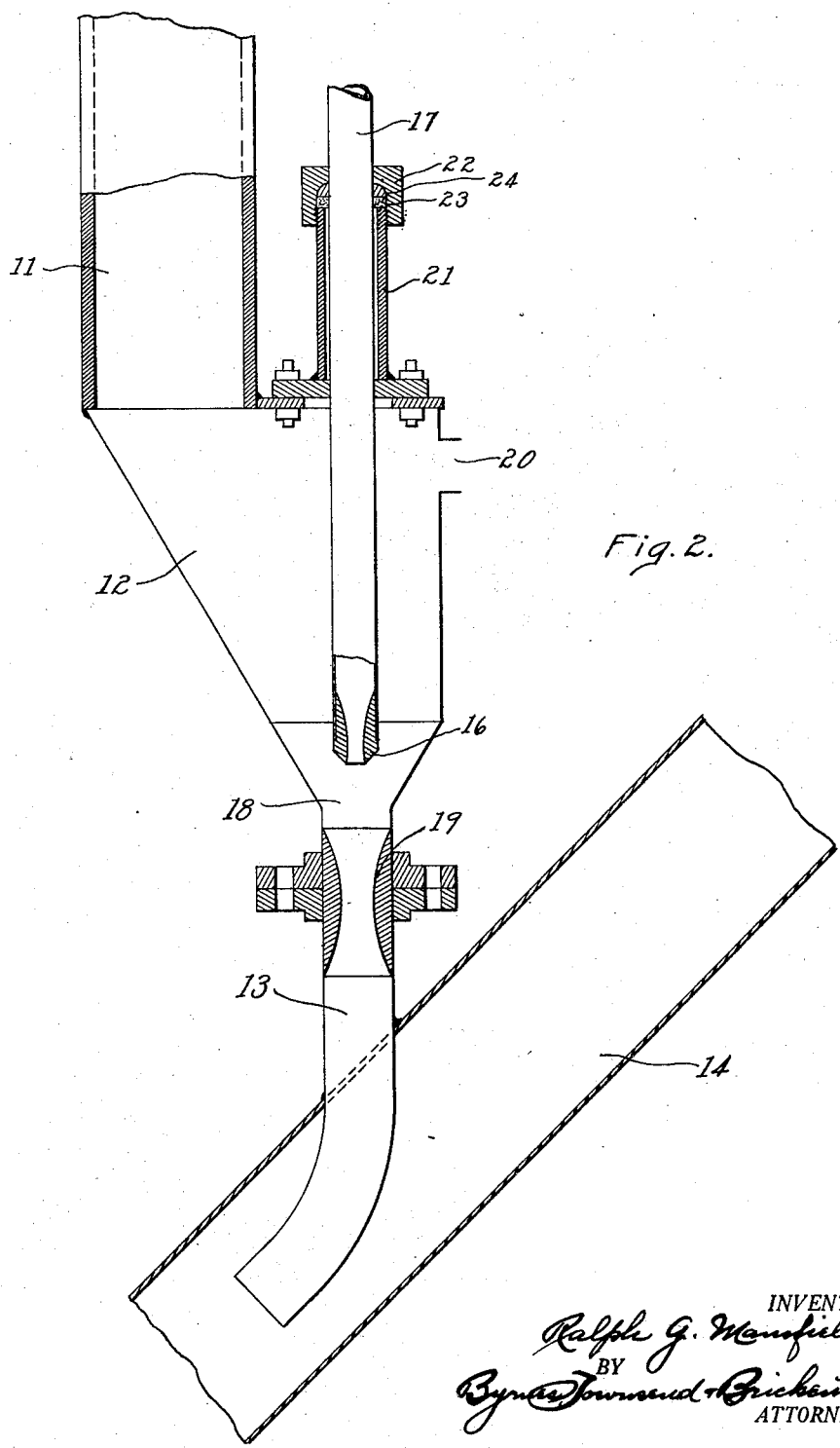
Fig. 2 is a vertical sectional view of the pneumatic feeding means shown in Fig. 1, with some modification of the discharge conduit.

In Fig. 2 the end of the pipe 13 is shown as projecting within the conduit 14 and curved so as to direct the current of material-laden gas longitudinally and in the direction of flow of the liquid in the conduit 14. This aids in the incorporation of the granular material with the liquid and insures against any tendency of the solid material to collect at the discharge orifice of the pipe 13, particularly as would occur when the pipe 13 is arranged to meet the conduit 14 at or nearly at right angles.

In preparing a cyanamide solution according to the present process, "nitrolim" or commercial calcium cyanamide is fed by means of any suitable feeding device, such as the feed screw 25, from the storage container 10 through the pipe 11 to the chamber 12. A gaseous fluid under pressure is injected through the nozzle 16 into the outlet orifice 18. The granular or pulverulent material, which in part flows to the bottom of the chamber 12 by reason of gravity and in part is carried to the bottom of said chamber by air or other gaseous fluid induced through the gas inlet orifice 20, is picked up by the fluid stream issuing from the nozzle 16 and is carried with increased velocity through the pipe 13 into an aqueous solution or slurry flowing in the conduit 14. The current of material-laden gas flows through the pipe 13 at such velocity as to prevent any of the liquid in the conduit 14 from entering the discharge outlet and thereby moistening the material and causing it to adhere to the inside of the pipe 13. The scouring action of the solution flowing through the conduit 14 also tends to keep moistened material from adhering to the outside of that part of the pipe 13 extending into the conduit 14.

In Fig. 1 the conduit 14 is shown as connected at its inlet end to the container 26 and at its outlet end to the tank 15. The tank 15 is connected with a suitable mixer or reaction vessel, not shown, in which carbon dioxide is introduced to precipitate as calcium carbonate the calcium content of the calcium cyanamide. In preparing cyanamide solutions from calcium cyanamide, the container 26 is filled with water or a weak solution of cyanamide obtained by washing the solid residue from a preceding operation. Or, if a more concentrated cyanamide solution is desired, the slurry resulting from the treatment of a previous batch in the mixer may be pumped to the container 26 by means of suitable connections and pumps not shown. The solution or slurry in the container 26 is then led into the conduit 14 and during its passage therethrough is mixed with calcium cyanamide in the manner above described. Instead of injecting the calcium cyanamide into the liquid as the latter flows through the conduit 14 it may be injected into the liquid in the tank 15.

According to the methods heretofore employed for bringing calcium cyanamide into solution or admixture with water, such as permitting the pulverulent calcium cyanamide to fall upon the surface of an aqueous solution in a container and incorporating the calcium cyanamide into the solution by the use of suitable agitating means, substantial quantities of calcium cyanamide dust have collected on the surfaces of the container, piping, etc., and particularly where such surfaces have been moist or wet the dust has adhered thereto forming a caked mass difficult to remove. This moist adhering mass also tends to increase the alkalinity of the solution with which it comes in contact and thereby promotes the formation of the objectionable dicyandiamide. The present method has the advantage that the calcium cyanamide is projected into the aqueous solution in such manner that each particle of the calcium cyanamide is quickly incorporated into the solution and is given no opportunity to collect upon and adhere to moist surfaces of the container or to other surfaces.

According to one form of my invention carbon dioxide or a carbon dioxide-containing gas is introduced through the nozzle 16, and if desired the gaseous fluid induced through the gas inlet orifice 20 may have a similar composition. In this manner, at least a part of the carbon dioxide required to react with the calcium cyanamide to precipitate the calcium content thereof may be supplied to the aqueous solution or slurry directly with the calcium cyanamide, thereby aiding in keeping the alkalinity of the solution low and assisting in preventing the formation of any substantial amount of the undesirable dicyandiamide.

While the process has been described with particular reference to the formation of cyanamide solutions, it is to be understood that the invention is applicable in carrying out other chemical reactions or in bringing about various physical admixtures or solutions as distinguished from chemical reactions. For example, the invention may be applied not only in bringing a granular or pulverulent material into solution with a desired liquid, but also in mixing any desired gas with a granular or pulverulent material and bringing them into solution with a desired liquid.

I claim:

1. In a process of preparing a solution of cyanamide practically free from dicyandiamide, the step which consists in gradually supplying to an aqueous liquid a mixture of calcium cyanamide and at least a part of the carbon dioxide required to completely react upon the calcium cyanamide present in the mixture.

2. Process of preparing a solution of cyanamide practically free from dicyandiamide, comprising providing an aqueous liquid, directing a stream of carbon dioxide-containing gas into said liquid, and entraining calcium cyanamide into said stream.

3. In a process of preparing a solution of cyanamide practically free from dicyandiamide, the step which comprises simultaneously adding to an aqueous liquid, pulverulent calcium cyanamide and at least a part of the carbon dioxide required to react therewith and substantially mixed therewith.

In testimony whereof, I affix my signature.

RALPH G. MANSFIELD.